United States Patent [19]

Takahashi et al.

[11] Patent Number: 4,690,239
[45] Date of Patent: Sep. 1, 1987

[54] CONTROL SYSTEM FOR INTERMEDIATE DIFFERENTIAL IN FOUR-WHEEL DRIVE VEHICLE

[75] Inventors: Tokuyuki Takahashi; Koujiro Kuramochi; Syoichi Sayou, all of Toyota, Japan

[73] Assignee: Toyota Jidosha Kabushiki Kaisha, Toyota, Japan

[21] Appl. No.: 899,012

[22] Filed: Aug. 22, 1986

[30] Foreign Application Priority Data

Aug. 23, 1985 [JP] Japan .......................... 60-129093[U]

[51] Int. Cl.$^4$ ............................................. B60K 17/34
[52] U.S. Cl. ................................... 180/249; 364/424.1
[58] Field of Search ............... 180/249, 250, 248, 247, 180/233; 364/424.1

[56] References Cited

U.S. PATENT DOCUMENTS 4,538,700  9/1985  Suzuki .......................... 180/249 X
4,609,064  9/1986  Suzuki et al. .................. 180/247 X

FOREIGN PATENT DOCUMENTS 2140104  11/1984  United Kingdom ............... 180/249

Primary Examiner—John A. Pekar
Attorney, Agent, or Firm—Oblon, Fisher, Spivak, McClelland, & Maier

[57] ABSTRACT

A control system for an intermediate differential in a four-wheel drive vehicle, the intermediate differential being provided with a lock mechanism which is operated under control of an actuator to selectively maintain the intermediate differential in a locked condition or an unlocked condition. The control system includes a first sensor arranged to detect a steering angle of a dirigible road wheel for producing a first detection signal therefrom when the steering angle exceeds a predetermined value, a second sensor arranged to detect disconnection of the drive power transmitted to the intermediate differential from a prime mover of the vehicle for producing a second detection signal therefrom when transmission of the drive power is disconnected, and a control device responsive to the first and second detection signals from the sensors for controlling the actuator in such a manner that the lock mechanism is operated to release the locked condition of the intermediate differential when the steering angle exceeds the predetermined value in a condition where the transmission of the drive power is disconnected.

5 Claims, 3 Drawing Figures

CONTROL SYSTEM FOR INTERMEDIATE DIFFERENTIAL IN FOUR-WHEEL DRIVE VEHICLE

BACKGROUND OF THE INVENTION

1. Field of the Invention

The present invention relates to an intermediate differential in a four-wheel drive vehicle, and more particularly to a control system for a lock mechanism of an intermediate differential in drive connection to a power transmission for transmitting therethrough the drive power to front and rear wheel drive axles, wherein the lock mechanism is operated under control of an actuator associated therewith to selectively effect engagement or disengagement between input and output elements of the differential.

2. Discussion of the Prior Art

In a four-wheel drive vehicle equipped with such an intermediate differential as described above, the actuator of the lock mechanism is operated by a driver of the vehicle to maintain the intermediate differential in a locked condition or an unlocked condition. Assuming that during travel of the vehicle the intermediate differential is locked in a condition where the power transmission is maintained in a neutral position or a clutch mechanism is maintained in a disengaged position, the component parts of the lock mechanism is applied with an excessive torque from the output element in turning maneuver of the vehicle. For this reason, it is required to strengthen the component parts of the lock mechanism for sufficient durability of the same. This results in an increase of the size, weight and manufacturing cost of the lock mechanism.

SUMMARY OF THE INVENTION

It is, therefore, a primary object of the present invention to provide a control system for the lock mechanism which is capable of automatically releasing the intermediate differential from its locked condition when transmission of the drive power to the intermediate differential is disconnected during turning maneuver of the vehicle.

According to the present invention, the primary object is attained by providing a control system for an intermediate differential in drive connection to a power transmission in a four-wheel drive vehicle for transmitting a drive power from a prime mover of the vehicle to front and rear wheel drive axles therethrough, the intermediate differential being provided with a lock mechanism which is operated under control of an actuator to selectively maintain the intermediate differential in a locked condition or an unlocked condition, wherein the control system comprises first means arranged to detect a steering angle of a dirigible road wheel, second means arranged to detect disconnection of the drive power transmitted to the intermediate differential from the prime mover, and third means for controlling the actuator in dependence upon detection of the steering angle and the disconnection of the drive power in such a manner that the lock mechanism is operated to release the locked condition of the intermediate differential when the steering angle exceeds a predetermined value in a condition where transmission of the drive power is disconnected.

Preferably, the first means is in the form of a sensor arranged to detect a steering angle of a dirigible road wheel for producing a first detection signal therefrom when the steering angle of the road wheel exceeds a predetermined value, the second means is in the form of a sensor arranged to detect disconnection of the drive power transmitted to the intermediate differential from the prime mover for producing a second detection signal therefrom when transmission of the drive power is disconnected, and the third means is responsive to the first and second detection signals from the sensors for controlling the actuator in such a manner that the lock mechanism is operated to release the locked condition of the intermediate differential when the steering angle of the road wheel exceeds the predetermined value in a condition where the transmission of the drive power is disconnected.

BRIEF DESCRIPTION OF THE DRAWINGS

Additional objects and features of the present invention will become readily apparent to those skilled in the art as the disclosure is made in the following detailed description of a preferred embodiment of the invention as illustrated in the accompanying drawings, in which.

DETAILED DESCRIPTION OF THE PREFERRED EMBODIMENT

Figure 1:
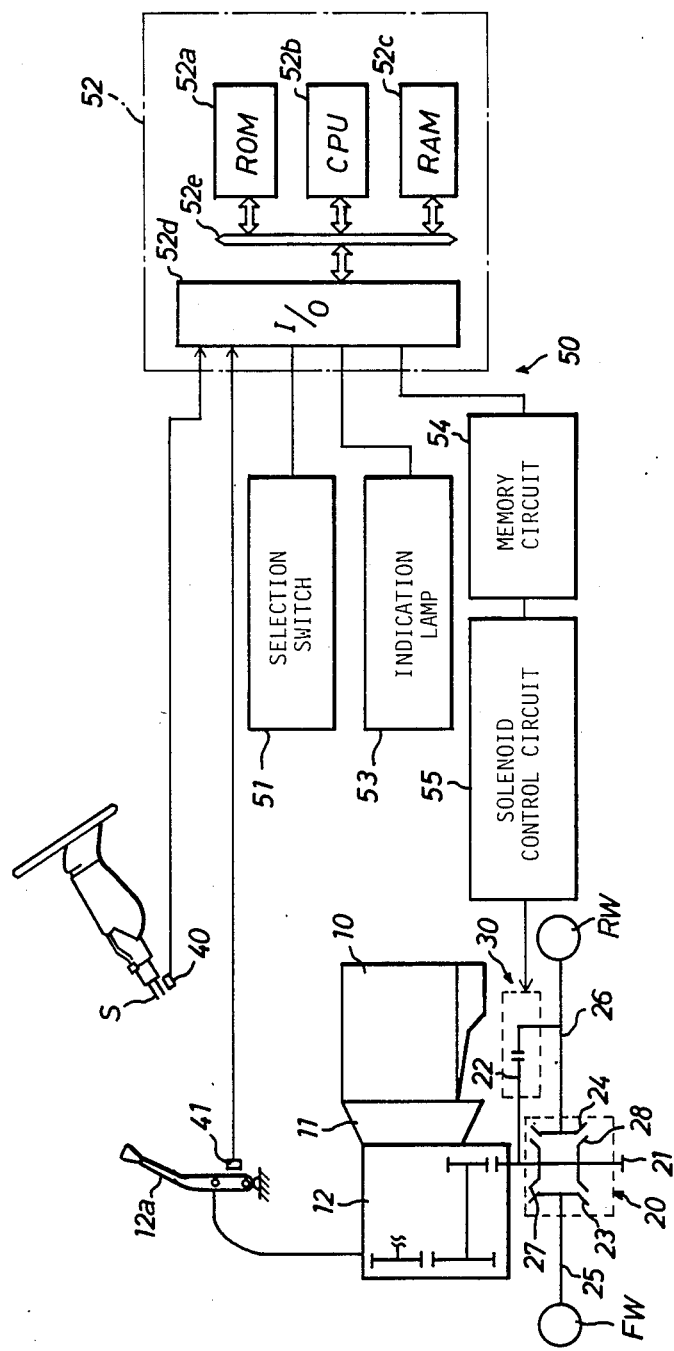
FIG. 1 is a schematic illustration of an electric control system for a lock mechanism of an intermediate differential in a four-wheel drive vehicle.

Referring now to the drawings, particularly in FIG. 1, there is schematically illustrated a four-wheel drive vehicle which comprises a power transmission 12 in the form of a change-speed gear transmission arranged to be applied with a drive power from an internal combustion engine 10 through a clutch mechanism 11, and an intermediate differential 20 drivingly connected to the power transmission 12 to transmit therethrough the drive power to drive axles of front and rear road wheels FW and RW.

The intermediate differential 20 is of the bevel gear type which includes an input element in the form of a ring gear 21 integral with a differential case 22, two output elements in the form of a pair of output shafts 25 and 26 respectively integral with side gears 23 and 24, and a pair of pinion gears 27 and 28 rotatably mounted within the differential case 22 and meshed with the side gears 23, 24 to transmit therethrough the drive power from the input element 21 to the output elements 25 and 26. The input element 21 is drivingly connected to an output gear of power transmission 12 in a usual manner.

Figure 2:
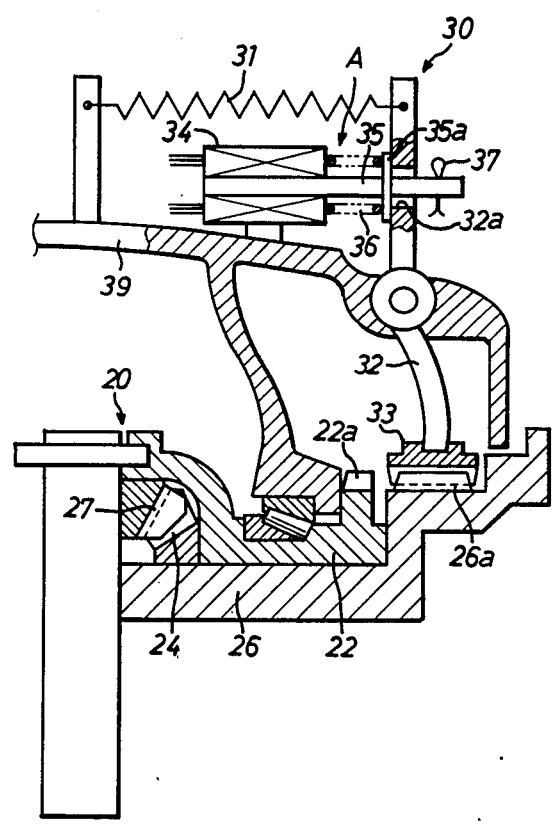
FIG. 2 is an enlarged sectional view of a portion of the intermediate differential shown in FIG. 1.

The intermediate differential 20 is provided with a lock mechanism 30 which is arranged to selectively effect engagement or disengagement between the differential case 22 and the output shaft 26. As shown in FIGS. 1 and 2, the lock mechanism 30 includes a lock lever 32 rotatably mounted on a housing 39 of the intermediate differential 20 and biased by a tension coil spring 31 in a counterclockwise direction, an internally splined clutch sleeve 33 axially slidably mounted on a toothed portion 26a of output shaft 26 and being coupled at its external groove with a lower end of lock lever 32 to be engaged with a toothed portion 22a of differential case 22 in response to clockwise rotation of the lock lever 32, and an electromagnetic actuator A for operating the lock lever 32.

The electromagnetic actuator A includes an electromagnetic solenoid 34 fixedly mounted on the housing 39 of differential 20, an armature rod 35 axially slidably supported within the solenoid 34 and extending through a hole 32a formed in an upper portion of lock lever 32, an annular flange 35a formed on an intermediate portion of armature rod 35, and a compression coil spring 36 arranged in surrounding relationship with the armature rod 35 and disposed between the solenoid 34 and the annular flange 35a of armature rod 35 to bias the armature rod 35 rightwards in FIG. 2. In this embodiment, the biasing force of coil spring 36 is determined to be larger than that of coil spring 31, and the armature rod 35 is provided with a pin 37 fixed thereon for preventing detachment from the lock lever 32. When the solenoid 34 is energized, the armature rod 35 is attracted against the biasing force of coil spring 36 to permit counterclockwise rotation of the lock lever 32 under the load of coil spring 31 to thereby maintain the clutch sleeve 33 in a disengaged position as shown in FIG. 2. When the solenoid 34 is deenergized, the biasing force of coil spring 36 causes the armature rod 35 to move rightwards against the load of coil spring 31 to thereby effect clockwise rotation of the lock lever 32. As a result, the clutch sleeve 33 is moved leftwards to engage the toothed portion 22a of differential case 22 so as to lock the intermediate differential 20.

As shown in FIG. 1, an electric control system 50 for the lock mechanism 30 includes a first sensor 40 mounted on a steering shaft assembly of the vehicle to detect a rotation angle of the steering shaft S so as to produce therefrom a first detection signal at a high level when a steering angle of the front dirigible road wheels FW exceeds a predetermined value, and a second sensor 41 coupled with a shift lever 12a of power transmission 12 to detect the shift position of power transmission 12 so as to produce therefrom a second detection signal at a high level when the shift lever 12a is maintained in a neutral position. The electric control system 50 further includes a user actuable selection switch 51 arranged to produce therefrom a first selection signal at a low level in a first condition where the intermediate differential 20 is unlocked under control of the lock mechanism 30 and to produce therefrom a second selection signal at a high level in a second condition where the intermediate differential 20 is locked under control of the lock mechanism 30, and a microcomputer 52 connected to the first and second sensors 40, 41 and selection switch 51 to selectively produce first and second control signals therefrom during execution of a control program shown in FIG. 3.

Figure 3:
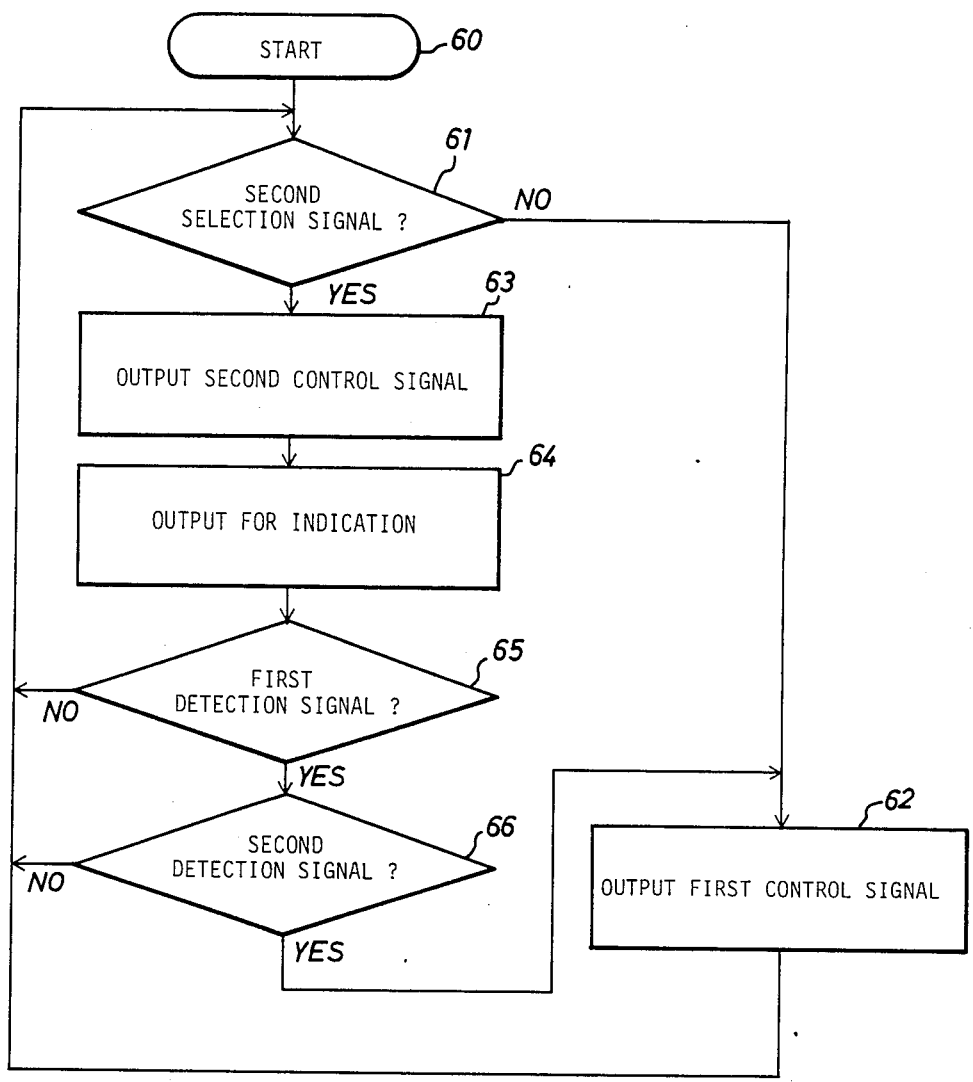
FIG. 3 is a flow chart of a control program for the lock mechanism shown in FIG. 1.

The microcomputer 52 comprises a read-only memory or ROM 52a for memorizing the control program shown by a flow chart in FIG. 3, a central processing unit or CPU 52b for executing the control program, a randam-access memory or RAM 52c for temporarily memorizing a variable necessary for execution of the control program, an input-output device or I/O 52d connected to the first and second sensors 40, 41 and selection switch 51 and connected to an indication lamp 53 and a memory circuit 54, and a bus 52e in connection to the ROM 52a, CPU 52b, RAM 52c and I/O 52d. The indication lamp 53 is arranged to indicate the locked condition of the intermediate differential 20 when it is lighted. The memory circuit 54 is arranged to selectively memorize the first and second control signals applied thereto from the computer 52. A solenoid control circuit 55 is connected to the memory circuit 54 to energize the solenoid 34 of lock mechanism 30 in response to the first control signal applied thereto through the memory circuit 54 and to deenergize the solenoid 34 in response to the second control signal applied thereto through the memory circuit 54.

Hereinafter, the operation of the computer 52 will be described with reference to the flow chart in FIG. 3. When an ignition switch of the engine 10 is closed, the CPU 52b is conditioned to initiate execution of the control program at step 60 and causes the program to proceed to step 61. Assuming that the selection switch 51 is operated by the driver to be maintained in the first condition, the CPU 52b determines a "NO" answer at step 61 in response to the first selection signal from switch 51 and causes the program to proceed to step 62. At step 62, the CPU 52b produces therefrom a first control signal at a high level for maintaining the intermediate differential 20 in the unlocked condition, and subsequently the memory circuit 54 memorizes the first control signal applied thereto from the CPU 52b through the I/O 52d. Thus, the solenoid control circuit 55 energizes the solenoid 34 of lock mechanism 30 in response to the first control signal applied thereto through the memory circuit 54. When the solenoid 34 is energized, the lock lever 32 is conditioned to maintain the clutch sleeve 33 in the disengaged position, as shown in FIG. 2 to thereby maintain the intermediate differential 20 in the unlocked condition. After execution at step 62, the CPU 52b will repeat the foregoing execution at steps 61 and 62.

When the selection switch 51 is operated by the driver to be maintained in the second condition, the CPU 52b determines a "YES" answer at step 61 in response to the second selection signal from switch 51 and causes the program to proceed to step 63. At step 63, the CPU 52b produces therefrom a second control signal at a low level for maintaining the intermediate differential 20 in the locked condition, and subsequently the memory circuit 54 memorizes the second control signal applied thereto from the CPU 52b through the I/O 52d. Thus, the solenoid control circuit 55 deenergizes the solenoid 34 in response to the second control signal applied thereto through the memory circuit 54. When the solenoid 34 is deenergized, the lock lever 32 is rotated clockwisely under the load of coil spring 36 to engage the clutch sleeve 33 with the toothed portion 22a of differential case 22 to thereby maintain the intermediate differential 20 in the locked condition. After execution at step 63, the program proceeds to step 64 where the CPU 52b produces therefrom an output signal for energizing the indication lamp 53. Then, the indication lamp is lighted by the output signal applied thereto from the CPU 52b through the I/O 52d to inform the driver of the locked condition of the intermediate differential 20.

Subsequently, the CPU 52b causes the program to proceed to step 65. Assuming that the steering angle of the front dirigible road wheels FW exceeds the predetermined value and that the power transmission 12 is maintained in the neutral position, the CPU 52b determines a "YES" answer at step 65 in response to the first detection signal from sensor 40 and causes the program to proceed to step 66. At step 66, the CPU 52b determines a "YES" answer in response to the second detection signal from sensor 41 and causes the program to proceed to step 62. As a result, the CPU 52b produces the first control signal therefrom at step 62, and in turn, the solenoid control circuit 55 energizes the solenoid 34 of lock mechanism 30 in response to the first control signal applied thereto through the memory circuit 54. This causes counterclockwise rotation of the lock lever 32 under the load of coil spring 31. Thus, the clutch sleeve 33 is disengaged from the toothed portion 22a of differential case 22 to release the intermediate differential 20 from its locked condition.

After the execution at step 62, the CPU 52b causes the program to proceed to step 61 and repeats the foregoing execution at steps 61, 63, 64, 65, 66 and 62. Assuming that during the foregoing execution at steps 61, 63, 64, 65, 66 and 62 the steering angle of the front dirigible road wheels FW decreases below the predetermined value, the CPU 52b determines a "NO" answer at step 65 and causes the program to proceed to step 61. Additionally, when the power transmission 12 is shifted from the neutral position to another position, the CPU 52b determines a "NO" answer at step 66 and causes the program to proceed to step 61.

From the above description, it will be understood that the electric control system 50 acts to automatically release the intermediate differential 20 from its locked condition when the steering angle of the front dirigible road wheels FW exceeds the predetermined value in a condition where the power transmission 12 is maintained in the neutral position. This means that when the power transmission 12 is maintained in the neutral position during turning maneuver of the vehicle, the intermediate differential 20 is automatically released from its locked condition at an initial stage of the turning maneuver to prevent the component parts of lock mechanism 30 from an excessive torque acting thereon. It is, therefore, able to enhance durability of the lock mechanism 30 without causing any increase of the size, weight and manufacturing cost of the same.

Although in the above-described embodiment the first sensor 40 is arranged to detect the rotation angle of steering shaft S so as to detect the steering angle of the front dirigible road wheels FW, it may be arranged to directly detect the steering angle of the front dirigible road wheels FW in dependence upon movement thereof. Furthermore, the second sensor 41 may be arranged to detect the face that the clutch mechanism 11 is maintained in a disengaged position.

While a preferred embodiment of the present invention has been shown and described herein in detail, those skilled in this art will recognize various alternative designs and embodiments for practicing the present invention as defined by the following claims.

What is claimed is:

1. A control system for an intermediate differential in drive connection to a power transmission in a four-wheel drive vehicle for transmitting a drive power from a prime mover of the vehicle to front and rear wheel drive axles therethrough, said intermediate differential being provided with a lock mechanism which is operated under control of an actuator to selectively maintain said intermediate differential in a locked condition or an unlocked condition, wherein the control system comprises:

first detecting means arranged to detect a steering angle of a dirigible road wheel for producing a first detection signal therefrom when the steering angle of said road wheel exceeds a predetermined value;

second detecting means arranged to detect disconnection of the drive power transmitted to said intermediate differential from said prime mover for producing a second detection signal therefrom when transmission of the drive power is disconnected; and means responsive to the first and second detection signals from said detecting means for controlling said actuator in such a manner that said lock mechanism is operated to release the locked condition of said intermediate differential when the steering angle of said road wheel exceeds the predetermined value in a condition where the transmission of the drive power is disconnected.

2. A control system as claimed in claim 1, wherein said first detecting means is in the form of a sensor mounted on a steering shaft assembly to detect a rotation angle of the steering shaft for producing a first detection signal therefrom when the steering angle of said road wheel exceeds a predetermined value.

3. A control system as claimed in claim 1, wherein said second detecting means is in the form of a sensor arranged to detect a shift position of said power transmission for producing a second detection signal therefrom when said power transmission is maintained in a neutral position.

4. A control system as claimed in claim 1, wherein said actuator is in the form of an electrically operated actuator and wherein said means responsive to the first and second detection signals from said detecting means comprises a selection switch arranged to produce a first selection signal therefrom in a first condition where said intermediate differential is unlocked under control of said lock mechanism and to produce a second selection signal therefrom in a second condition where said intermediate differential is locked under control of said lock mechanism, a computer connected to said first and second detecting means and said selection switch and including means for producing a first control signal therefrom in response to the first selection signal, means for producing a second control signal therefrom in response to the second selection signal, and means for producing the first control signal in response to the first and second detection signals from said detecting means after applied with the second selection signal from said switch, and a control circuit connected to said computer for controlling said actuator in response to the first control signal in such a manner that said lock mechanism is operated to release the locked condition of said intermediate differential and for controlling said actuator in response to the second control signal in such manner that said lock mechanism is operated to maintain said intermediate differential in the locked condition.

5. A control system for an intermediate differential in drive connection to a power transmission in a four-wheel drive vehicle for transmitting a drive power from a prime mover of the vehicle to front and rear wheel drive axles therethrough, said intermediate differential being provided with a lock mechanism which is operated under control of an actuator to selectively maintain said intermediate differential in a locked condition or an unlocked condition, wherein the control system comprises:

first means arranged to detect a steering angle of a dirigible road wheel;

second means arranged to detect disconnection of the drive power transmitted to said intermediate differential from said prime mover; and third means for controlling said actuator in dependence upon detection of the steering angle and the disconnection of the drive power in such a manner that said lock mechanism is operated to release the locked condition of said intermediate differential when the steering angle exceeds a predetermined value in a condition where transmission of the drive power is disconnected.

* * * * *